United States Patent [19]
Kautz

[11] Patent Number: 5,236,144
[45] Date of Patent: Aug. 17, 1993

[54] CABLE EXTENSION LINEAR POSITION TRANSDUCER

[75] Inventor: Thomas O. Kautz, Mequon, Wis.

[73] Assignee: Johnson Service Company, Milwaukee, Wis.

[21] Appl. No.: 867,989

[22] Filed: Apr. 13, 1992

[51] Int. Cl.$^5$ ............................................ B65H 75/48
[52] U.S. Cl. ................................................. 242/107
[58] Field of Search ................. 242/107, 107.2, 107.3, 242/107.5, 107.6, 107.7; 33/754, 835; 116/262

[56] References Cited

U.S. PATENT DOCUMENTS

| | | | |
|---|---|---|---|
| 1,975,419 | 10/1934 | Grube | 242/107.2 X |
| 2,166,479 | 7/1939 | Ruddock | 242/107 X |
| 2,269,534 | 1/1942 | Jaeger | 242/107.2 |
| 2,338,385 | 1/1944 | Sorensen | 242/107.2 X |
| 3,069,777 | 12/1962 | Isbell | 33/835 |
| 4,010,913 | 3/1977 | Guerster et al. | 242/107 |
| 4,013,843 | 8/1978 | Nothdurft | 242/107 |
| 4,730,783 | 3/1988 | Lamson | 242/107.3 X |

Primary Examiner—John M. Jillions
Attorney, Agent, or Firm—Foley & Lardner

[57] ABSTRACT

The present invention provides a cable extension linear position transducer which according to one aspect of the invention, has an integrated support structure including a base and a housing. A potentiometer is attached to the housing and includes a shaft which extends into the housing. A drum is affixed to the shaft and to a spring which is connected to the housing. As the drum is turned, the spring is wound tighter to provide the retraction torque necessary to return the drum to its initial position.

11 Claims, 4 Drawing Sheets

CABLE EXTENSION LINEAR POSITION TRANSDUCER

TECHNICAL FIELD

This invention relates to linear position detection devices, particularly to cable extension linear position transducers.

BACKGROUND OF THE INVENTION

Linear position detection devices take many forms including LVDT's, rectilinear potentiometers, and ultrasonics. Cable extension transducers, however, are easier to install and less alignment sensitive. Cable extension linear position transducers are especially advantageous for longer travel ranges since they are more compact that LVDT's and rectilinear potentiometers.

A cable extension linear position transducer typically requires a drum attached to some type of potentiometer and a power spring to provide retraction torque when the drum is rotated against the spring. A cable is attached to the drum and wrapped around the drum leaving a free or outer end which can be attached to a moving item, the position of which is to be detected. As the item moves, it unreels the cable, thereby rotating the drum around which the cable is wrapped. The drum simultaneously turns a potentiometer shaft to which it is affixed, creating a measurable change in resistance output proportional to the length of cable travel. Meanwhile, the power spring is wound tighter as the drum rotates to release a greater length of cable. This power spring is thus able to provide the retraction torque necessary to reel the cable back in. These components are usually joined together by a variety of parts and fasteners.

A problem with existing cable extension linear position transducers is their complexity. They fail to provide the essential functions with a minimum number of parts. Using an excessive number of components increases the difficulty of assembly, requires the use of fasteners, and leads to a higher cost product.

The present invention addresses the foregoing drawbacks of known cable extension linear position transducers.

SUMMARY OF THE INVENTION

The present invention provides a cable extension linear position transducer which, according to one aspect of the invention, has an integrated support structure including a base and a housing. A potentiometer is attached to the housing and includes a shaft which extends into the housing. A drum is affixed to the shaft and rotatably mounted over the housing for rotating movement with respect to the housing. A spring is connected between the housing and the shaft and is wound tighter as the drum is rotated in one direction. This spring is thus able to provide the retraction torque necessary to return the drum to its initial position.

BRIEF DESCRIPTION OF THE DRAWING

The invention will hereafter be described with reference to the accompanying drawing, wherein like numerals denote like elements.

DETAILED DESCRIPTION OF A PREFERRED EMBODIMENT

Figure 1:
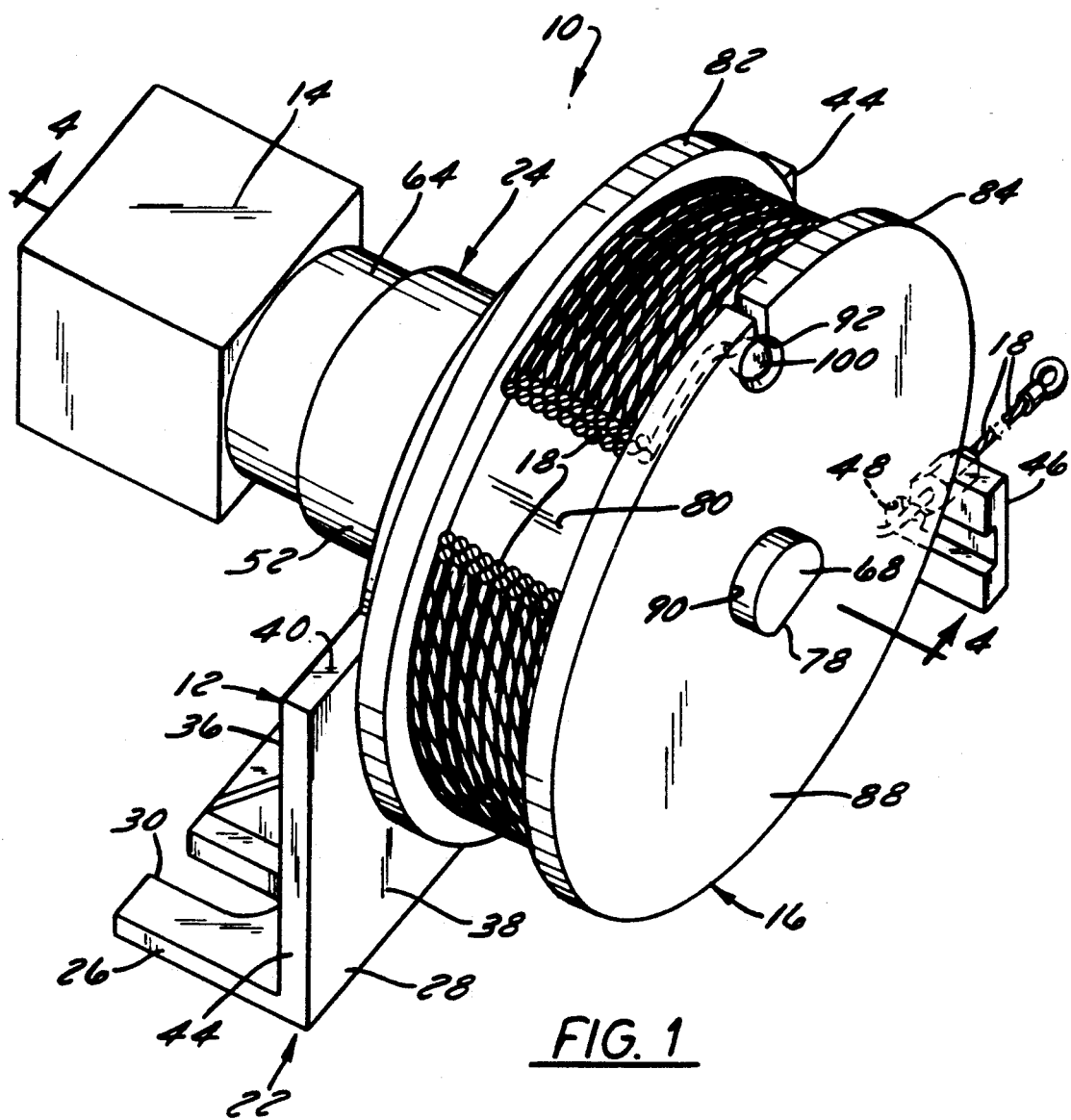
FIG. 1 is a perspective view of a cable extension linear transducer according to a preferred form of the invention.
Figure 6:
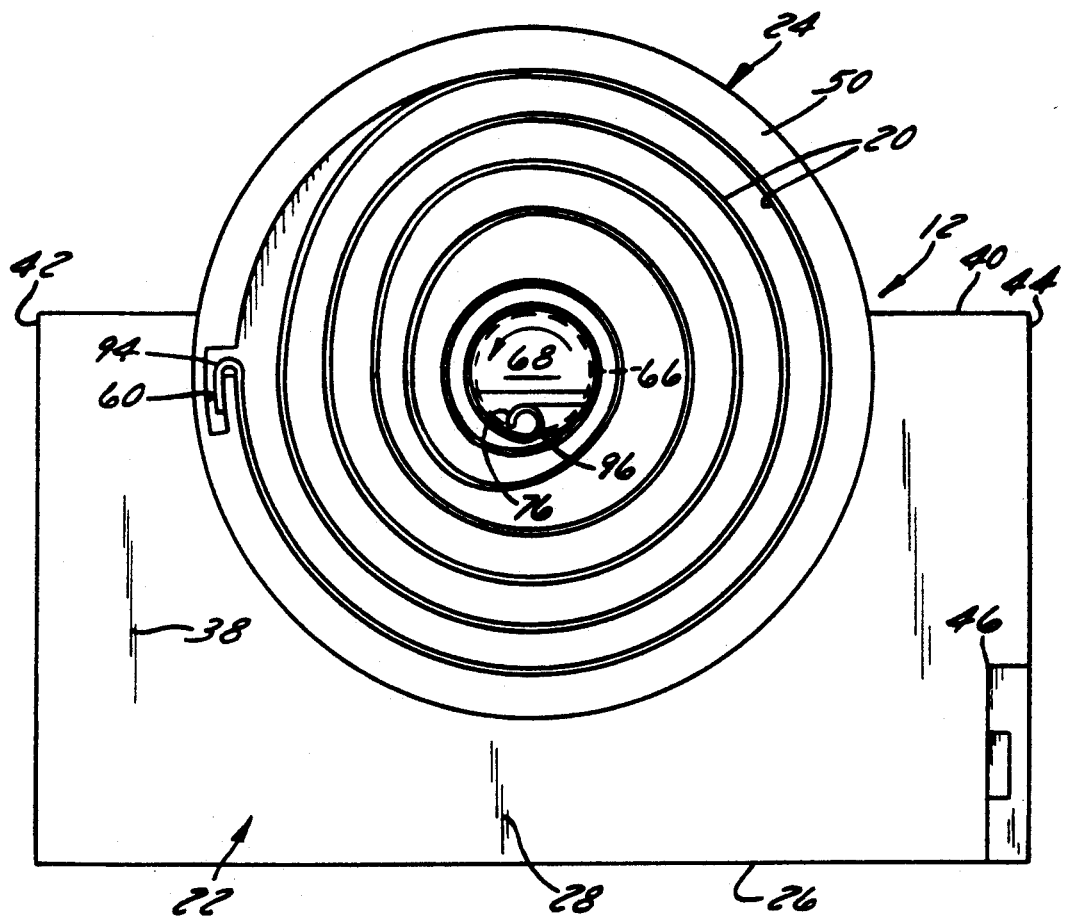
FIG. 6 is a view of a spring mounted in the integrated support structure and connected to a potentiometer shaft according to the preferred embodiment of the invention.
Figure 7:
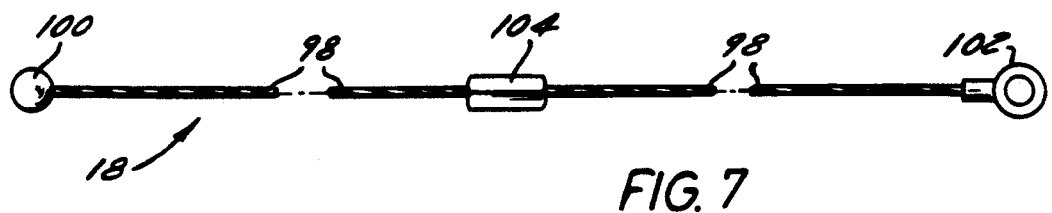
FIG. 7 is a view of a cable assembly useful in the preferred embodiment of the invention.

Referring now to FIG. 1, a cable extension linear position transducer 10 according to a preferred aspect of the invention includes, as main components, an integral support structure 12, a potentiometer 14 attached to integrated support structure 12, and a drum 16 connected to potentiometer 14 and rotatably mounted on integrated support structure 12. A cable assembly 18 is also attached to drum 16 and wrapped around same. As shown in FIG. 6, a power spring 20 is connected between integrated support structure 12 and potentiometer 14.

Figure 2:
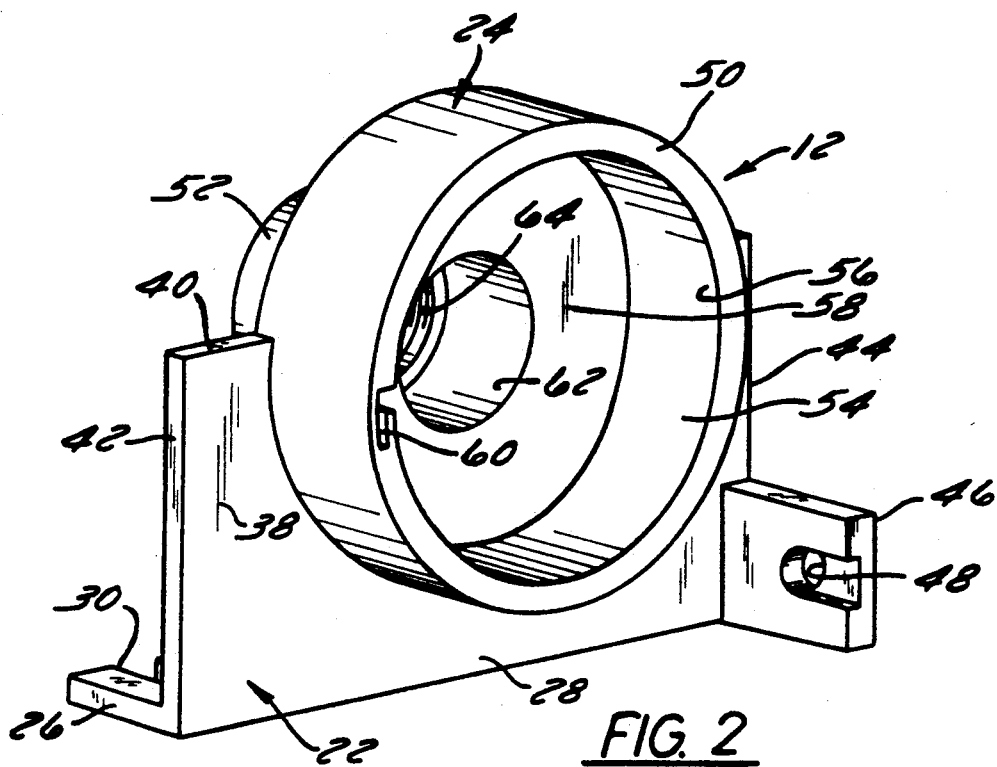
FIG. 2 is a perspective view of an integrated support structure, showing the inside of the housing, according to a preferred form of the invention.
Figure 3:
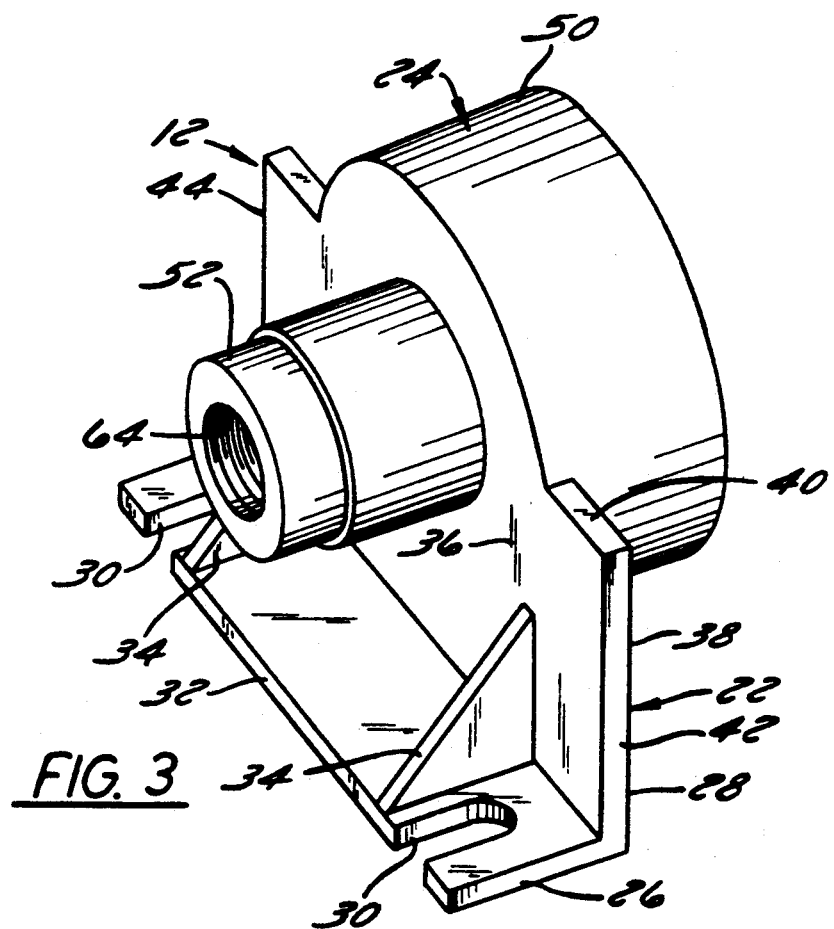
FIG. 3 is a perspective view, showing the outside of the integrated support structure shown in FIG. 2.

Referring to FIGS. 2 and 3, integrated support structure 12 comprises a base 22 and a housing 24 which is integral with base 22 and extends upwardly and outwardly from base 22. Base 22 includes a bottom plate 26 and a support plate 28 which are perpendicular to one another. Bottom plate 26 has a pair of mounting slots 30 which are generally U-shaped, extend through an edge 32 disposed on the opposite side of bottom plate 26 from support plate 28 and which are located generally near the ends of bottom plate 26. Respective triangular supports 34 are disposed between bottom plate 26 and support plate 28 to reinforce base 22. Triangular supports 34 are preferably integrally formed as part of support structure 12, as are the other components, and help maintain support plate 28.

Support plate 28 includes a first planar surface 36 (to which supports 34 are attached), a second planar surface 38 and a top edge 40 disposed on the opposite side of support plate 28 from bottom plate 26. Respective side edges 42 and 44 of support plate 28 extend between top edge 40 and bottom plate 26.

Extending from the second surface 38 in the corner of support plate 28 adjacent to side edge 44 and bottom plate 26 is a cable bracket 46 shown best in FIG. 2. Cable bracket 46 is generally rectangular in shape and extends perpendicularly from second surface 38. Through cable bracket 46 is a cable exit hole 48 which extends generally parallel to both support plate 28 and bottom plate 26.

Housing 24 is integrally molded with base 22 and comprises a generally cylindrical bushing 50 and a potentiometer mount 52, the latter being an extended portion of housing 24. Bushing 50 extends from support plate 28 in a direction opposite to bottom plate 26 but generally parallel to bottom plate 26. Bushing 50 includes a hollow inner chamber 54 designed to house power spring 20. Inner chamber 54 is formed by a cylindrical wall 56 and a back wall 58 which is generally aligned with and parallel to support plate 28. Communicating with inner chamber 56 and located in cylindrical wall 56 is a notch 60 which is preferably L-shaped but may be of other configurations. It is used to secure power spring 20 to integral support structure 12.

Potentiometer mount 52 is also generally cylindrical in shape but is preferably smaller in diameter than bushing 50. Potentiometer mount 52 extends from its first planar surface 36 and is generally parallel to bottom plate 26. It extends in a direction opposite to that of bushing 50. An aperture 62, coaxial with potentiometer mount 52, communicates with inner chamber 54 and extends through potentiometer mount 52 to an internally threaded end 64 of potentiometer mount 52.

Potentiometer 14 may be any of a number of standard potentiometers, however, the Bourns Model 84 is preferably used in this application. The Bourns Model 84 is a ten (10) turn, linear, long life potentiometer which can be threaded into internally threaded end 64 of potentiometer mount 52. In an alternate embodiment, potentiometer 14 could be replaced by any other form of rotary position transducer, for example, an encoder.

Figure 4:
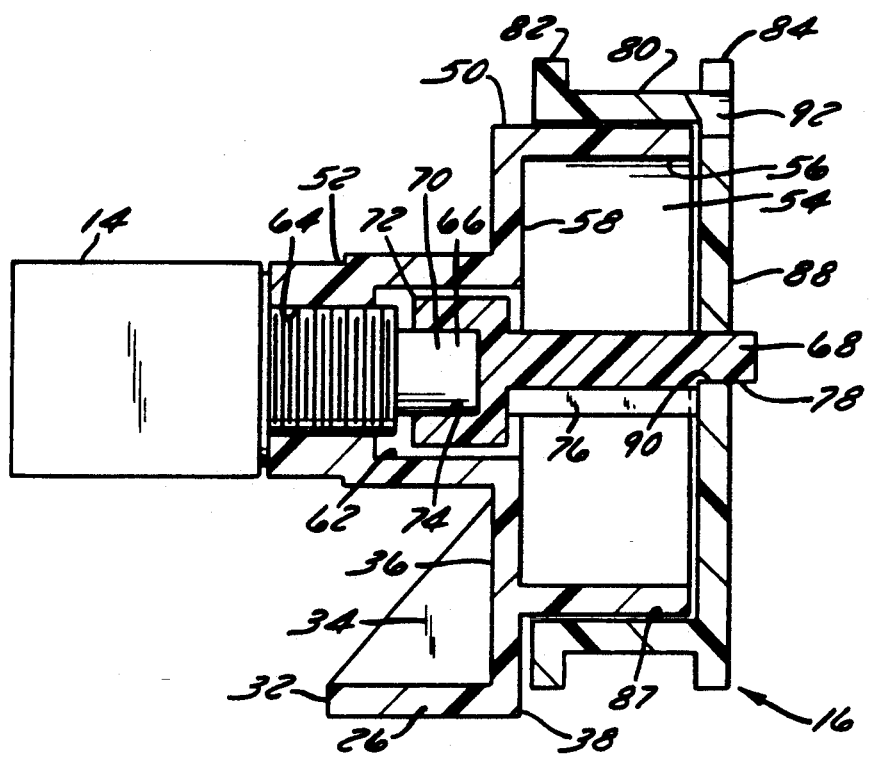
FIG. 4 is a cross-sectional view taken along line 4—4 in FIG. 1.

Potentiometer 14 includes a potentiometer shaft 66 (see FIG. 4) which extends through aperture 62 and hollow inner chamber 54. Shaft 66 preferably extends beyond bushing 50 when potentiometer 14 is fully threaded into potentiometer mount 52. In a preferred embodiment, as shown in FIG. 4, potentiometer shaft 66 includes a shaft adapter 68 which is press fit over a short shaft 70 of potentiometer 14. Potentiometer shaft 66 can be an integral shaft or have components such as short shaft 70 and shaft adapter 68. Shaft adapter 68 is generally cylindrical in shape with an enlarged end 72 having a cavity 74 which is press fit over short shaft 70. A catch 76 (see FIG. 6) is cut along shaft adapter 68 and provides a recessed feature, such as a groove, which can engage and hold the inner end 96 of power spring 20. An outer end 78 of shaft adapter 68 is preferably formed in the shape of a half cylinder for mating engagement with drum 16 soon to be described. Many other shapes will work provided they can be keyed to drum 16 in order to prevent rotation of drum 16 with respect to shaft 66.

Figure 5A:
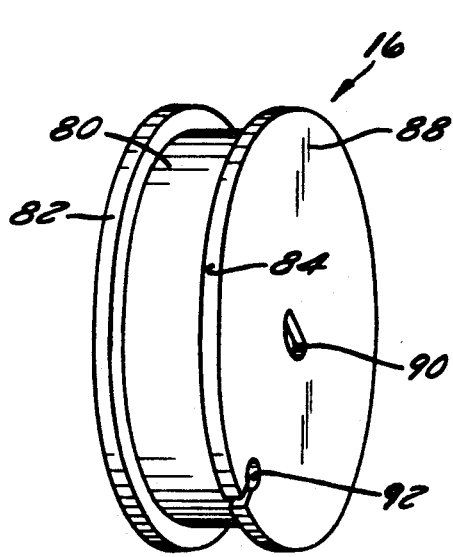
FIG. 5A and 5B are perspective views showing the two sides of a drum useful in the preferred embodiment of the invention.
Figure 5B:
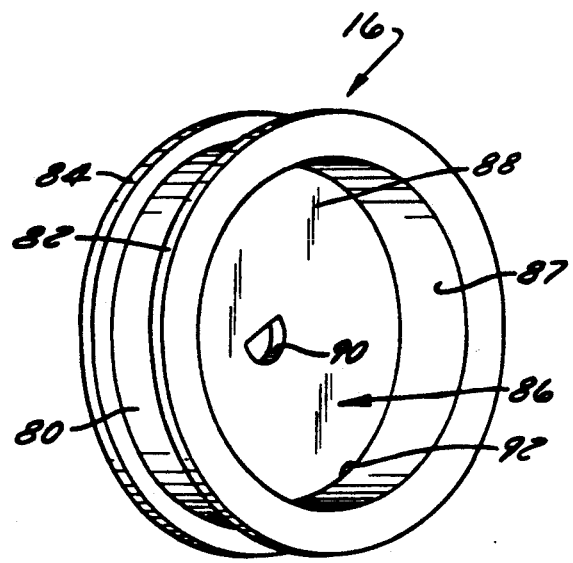

Referring to FIGS. 5A and 5B, drum 16 is generally in the shape of a hollow spool and comprises a cylindrical wall 80 having an inner flange 82, an outer flange 84 and an inner cavity 86 appropriately sized for rotatable engagement with bushing 50 of integral support structure 12. Cavity 86 is configured to slide over bushing 50 in close proximity but with sufficient space to allow free rotation of drum 16 on bushing 50. In a preferred embodiment, a plurality of grooves 87 are preferably cut axially into the surface of cylindrical wall 80 on the side exposed to inner cavity 86. Grooves 87 help prevent cogging due to debris caught between drum 16 and bushing 50. Flanges 82 and 84 extend radially outward from cylindrical wall 80. A planar outer wall 88 extends radially inward from cylindrical wall 80 and outer flange 84 and is preferably solid except for an opening 90 which is in the form of a half circle and configured for mating engagement with shaft adapter end 78. Outer flange 84 also includes a keyhole shaped pocket 92 for attaching and holding cable assembly 18 to drum 16.

Referring to FIG. 6, power spring 20 includes an outer end 94 which is curled over to form a hook for mating engagement with notch 60 in integral support structure 12. Power spring 20 also includes inner end 96 which is appropriately curled for mating engagement with catch 76 of potentiometer shaft 66. In a preferred embodiment, spring 20 is made from 0.006. inch thick by 0.50 inch wide 302 stainless steel. Power spring 20 may be a lubricated spiral type spring having approximately 29 turns. When installed, outer end 94 engages notch 60 and power spring 20 spirals inward, counter clockwise around and towards potentiometer shaft 66 where inner end 96 is engaged with catch 76.

Cable assembly 18 comprises a cable 98, a fastener end 100 affixed at one end of cable 98, an attachment end 102 affixed at the other end of cable 98, and a hex plug 104 preferably crimped at an intermediate length on cable 98. Fastener end 100 is preferably in the shape of a ball or sphere. Cable assembly 18 is designed so that the ball end 100 is passed through hole 48 and then cable 98 is slid into the keyhole shaped pocket 92. When cable assembly 18 is placed in tension, ball end 100 comes to rest against pocket 92 of outer flange 84 and holds cable 98 as it is wrapped or unwrapped from around cylindrical wall 80 of drum 16. Hex plug 104 prevents the cable from retracting too far back and is used to maintain a minimum amount of retraction force on cable 18.

In a preferred embodiment, integral support structure 12, drum 16 and shaft adapter 68 are injection molded plastic parts. Integral support structure 12 is preferably molded from acetal because of the wear resistance needed for the bushing function. Similarly, shaft adapter 68 is preferably made of acetal, although other materials may be used since adapter 68 is not as susceptible to wear. Drum 16 is preferably molded from nylon 6/12 since the combination of nylon 6/12 and the acetal used in support structure 12 results in superior wear characteristics and squeak free operation when drum 16 rotates about bushing 50.

OPERATION

During operation, potentiometer 14 is threadably engaged with potentiometer mount 52 and potentiometer shaft 66, including shaft adapter 68, extends through hollow inner chamber 54 of bushing 50. Power spring 20 is prewound approximately five turns and inserted into hollow inner chamber 54 of bushing 50 where power spring inner end 96 is hooked or engaged with catch 76 on shaft adapter 68 and power spring outer end 94 is hooked or engaged with notch 60 of bushing cylindrical wall 56. Drum 16 is then placed over bushing 50 and opening 90 is press fit over shaft adapter end 78. Thus, drum 16 is keyed to potentiometer shaft 66 for rotatable motion with respect to bushing 50.

Cable assembly 18 is connected to drum 16 by passing fastener end 100 through cable exit hole 48 and then placing it into pocket 92 located in outer flange 84 of drum 16. Cable 98 is then wrapped counter clockwise around drum 16 until hex plug 104 abuts against cable bracket 46 adjacent exit hole 48. Cable 98 is then given one more wrap around drum 16 to place cable 98 under tension between fastener end 100 and hex plug 104. Cable exit hole 48 and cable bracket 46 prevent cable 98 from slipping over inner flange 82 or outer flange 84 of drum 16 due to misalignment.

Cable extension linear position transducer 10 is operated when a pulling force is exerted on cable assembly attachment end 102. As attachment end 102 is pulled out, the cable causes rotation of drum 16 in a counter clockwise direction which simultaneously rotates potentiometer shaft 66 to provide an indication of the extent of linear motion. When the tension in cable assembly 18 is released, power spring 20 has sufficient stored energy to provide the retraction torque necessary to rotate potentiometer shaft 66 which in turn rotates drum 16 clockwise. Rotating drum 16 retracts cable assembly 18 until hex plug 104 is stopped against cable bracket 46.

Cable extension linear position transducer 10 can be used in many applications where precise measurement of the linear movement of an item is necessary. This is accomplished by connecting attachment end 102 to the item which will undergo linear movement. For example, the present invention may be used as part of a fume hood control system where it is necessary to measure sash position.

It will be understood that the foregoing description is of a preferred exemplary embodiment of this invention, and that the invention is not limited to the specific form shown. For example, various materials may be used for the component parts and different dimensions and lubricants may be used in conjunction with power spring 20. Also, various components can be combined or interchanged. These and other modifications may be made in the design and arrangement of the elements without departing from the scope of the invention as expressed in the appended claims.

What is claimed is:

1. A cable extension linear position transducer, comprising:
    a support structure including a generally cylindrical bushing and an extended generally cylindrical portion in axial alignment with the bushing,
    a potentiometer attached to the extended portion and having a shaft extending through the extended portion and the bushing,
    a drum affixed to the shaft and rotatably disposed about the bushing for rotating movement with respect to the bushing, and
    a spring disposed within the bushing an inner end of the spring being attached to the shaft and an outer end of the spring being attached to the bushing, whereby as the drum is rotated against the tension of the spring, the spring stores sufficient energy to return the drum to its initial radial position.

2. The cable extension linear position transducer of claim 1, further comprising a cable assembly having an attachment end and a fastener end, the fastener end being attached to the drum so that the cable is wound about the drum as the drum rotates in one direction and unwound as the drum rotates in the opposite direction.

3. The cable extension linear position transducer of claim 1, wherein the support structure further comprises a cable bracket having a cable exit hole.

4. The cable extension linear position transducer of claim 1, wherein the support structure is integrally molded from one material.

5. The cable extension linear position transducer of claim 4, wherein the material is acetal.

6. The cable extension linear position transducer of claim 1, wherein the potentiometer shaft comprises a shaft adapter having a keyed end and a catch for holding an inner end of the spring.

7. The cable extension linear position transducer of claim 6, wherein the drum includes a cylindrical wall which fits over and rotates in close proximity to the bushing, an inner flange extending radially outward from the cylindrical wall, an outer flange extending radially outward from the cylindrical wall, and a solid planar wall extending radially inward from the outer flange, the planar wall having an opening adapted to be press fit over the keyed end of the shaft adapter.

8. The cable extension linear position transducer of claim 7, wherein the drum is made from nylon 6/12.

9. The cable extension linear position transducer of claim 7, wherein the drum includes respective axial grooves on the bushing side of the cylindrical wall.

10. The cable extension linear position transducer of claim 1, wherein the spring is lubricated and has a spiral configuration with a plurality of turns.

11. A cable extension linear position transducer, comprising:
    a support structure including a generally cylindrical bushing, an extended generally cylindrical portion in axial alignment with the bushing, and a cable bracket having a cable exit hole, wherein the support structure is integrally molded from one material,
    a potentiometer attached to the extended portion and having a shaft extending through the extended portion and the bushing,
    a drum affixed to the shaft and rotatably disposed about the bushing for rotating movement with respect to the bushing, wherein the drum includes a cylindrical wall which fits over and rotates in close proximity to the bushing, an inner flange extending radially outward from the cylindrical wall, an outer flange extending radially outward from the cylindrical wall, a planar wall extending radially inward from the outer flange, the planar wall having an opening adapted to be press fit over the shaft,
    a spring disposed within the bushing, an inner end of the spring being attached to the shaft and an outer end of the spring being attached to the bushing, whereby as the drum is rotated against the tension of the spring, the spring stores sufficient energy to return the drum to its initial radial position, and
    a cable assembly having an attachment end and a fastener end, the fastener end being attached to the drum and the cable being wound about the drum.

* * * * *